(No Model.)

H. W. LIBBEY.
VELOCIPEDE.

No. 351,872. Patented Nov. 2, 1886.

Witnesses
G. Blanka
T. F. Currier

Inventor
H. W. Libbey
by J. H. Adams
Attorney.

N. PETERS, Photo-Lithographer, Washington, D. C.

UNITED STATES PATENT OFFICE.

HOSEA W. LIBBEY, OF BOSTON, MASSACHUSETTS.

VELOCIPEDE.

SPECIFICATION forming part of Letters Patent No. 351,872, dated November 2, 1886.

Application filed June 15, 1885. Serial No. 168,670. (No model.)

*To all whom it may concern:*

Be it known that I, HOSEA W. LIBBEY, a citizen of the United States, residing at Boston, in the county of Suffolk and State of Massachusetts, have invented certain new and useful Improvements in Velocipedes, of which the following is a specification.

My invention relates to an improved velocipede, whereby I utilize the power imparted by a wheel of large diameter in connection with treadles operated by the occupant for propelling a two-wheeled vehicle, which may contain one or more persons.

The invention consists in certain details of construction and combination of parts, as specifically described, and as set forth in the claims.

Figure 1:
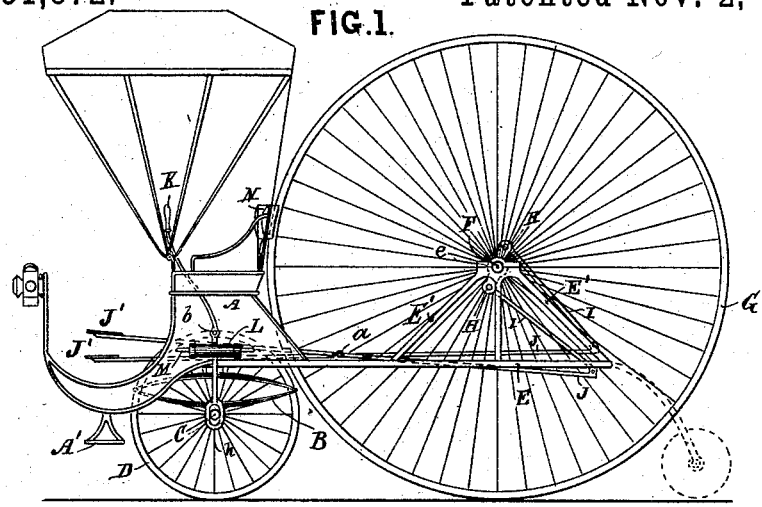
Figure 4:
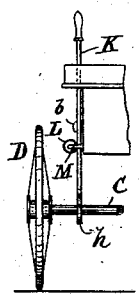
Figure 2:
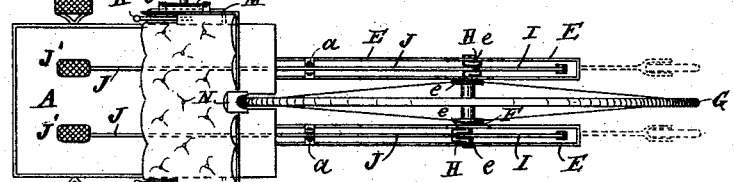
Figure 5:
Figure 6:
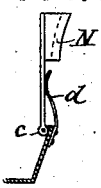
Figure 3:
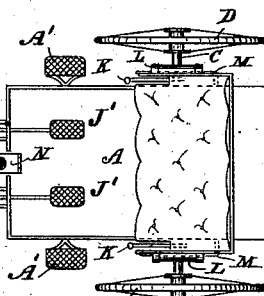
Figure 7:
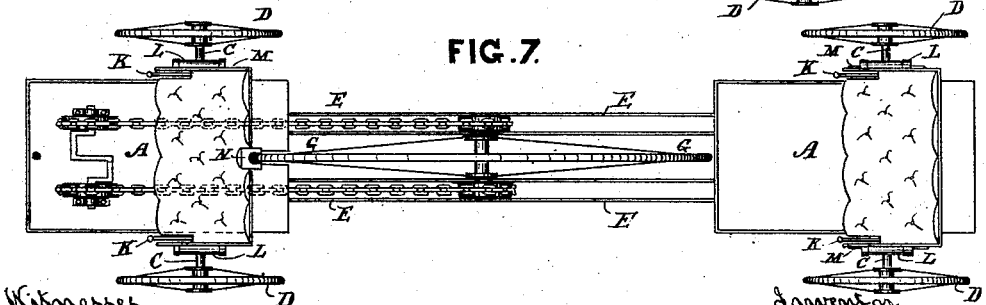

Referring to the accompanying drawings, Figure 1 is a side view of my invention. Fig. 2 is a plan or top view of the same. Fig. 3 is a plan view showing the large single wheel arranged in front of the two-wheeled vehicle. Figs. 4 to 6 are views in detail of various parts of the invention. Fig. 7 is a plan or top view of a modification of my invention.

A represents the body of a light vehicle properly mounted on springs B, which are supported on the axle C of the wheels D D.

E E are light metal frames, secured at their forward portion to the under side of the vehicle-body. These frames consist of metal rods or bars, and extend some distance to the rear, having at their rear ends bars E' E', which extend upward at an angle, and have at their upper ends bearings e e, in which is journaled the axle of the driving-wheel G of considerable diameter. The axle F is made with a crank, H, on each side of the driving-wheel, the said cranks being attached by means of suitable connecting-rods, I, to levers J, which are fulcrumed on the frames E E at a a. The levers J J pass through the body of the vehicle A, and are provided with treadles J' J', so as to be operated by the occupant of the vehicle, and as the levers are alternately depressed motion will be imparted to the driving-wheel G.

K K are levers provided with handles within reach of the occupant, and are fulcrumed at the sides of the vehicle-body A. The lower ends of the levers K are provided with loops or forks h, that pass over the axle C, so that by moving the levers one way or the other the axle C will be turned to guide the wheels D, as desired.

In order to retain the levers K in any desired position, I connect them to a cylinder, L, which is mounted on a rod or bar, M, secured to the body of the vehicle. (See Figs. 4 and 5.) The cylinder L is filled with india-rubber, and is provided at each end with a screw-cap, which, when screwed upon the cylinder, compresses the rubber and causes it to bind upon the rod M, thus holding the cylinder in any position it may be made to assume by the lever K.

To the back of vehicle-body is attached a brake, N, by means of a hinge, c. (See Fig. 6.) The said brake is held away from the driving-wheel G, when not in use, by means of a spring, d. When the brake is to be applied, the occupant presses his back against it, thus leaving his hands free to manage the guiding-levers. A' A' are steps to the vehicle.

In Fig. 3 the driving-wheel G is shown as placed in front of the vehicle, in which case the brake is to be operated by the foot.

If desirable, the rear ends of the frames E E may be supported upon small wheels, as indicated by dotted lines in Figs. 1 and 2.

In Fig. 7 are shown two vehicle-bodies placed one behind the other with the large driving-wheel placed between the two, in which case sprocket-wheels are secured to the axle of the large driving-wheel G, and also to the ends of a double crank operated by the feet of the occupant of the forward vehicle, the said sprocket-wheels having endless chains passing around them, by means of which the large wheel G is rotated.

By means of the construction, as above described, I am enabled to employ a driving-wheel of large diameter—say, seven feet—thereby requiring a much less number of revolutions to a given distance than those of velocipedes of the ordinary construction, and consequently a very great degree of speed can be attained. The seat can be made to hold two persons, and the treadles be operated by both or by only one.

I have shown and described one driving-wheel, but more than one may be used, if desirable.

What I claim as my invention, and desire to secure by Letters Patent, is—

1. The combination, with the front axle of a tricycle, of a carriage-body supported on springs thereon, guiding-levers having loops surrounding the ends of the axle, and having handles at the sides of the carriage-body and friction devices for retaining said handles in any set position, treadles above the floor of the carriage-body, a driving-wheel in rear of said body, and crank-connections from the treadles to the drive-wheel axle, all substantially as described.

2. In a tricycle, a carriage-body mounted above the front axle, a drive-wheel of larger diameter than the front wheels in rear of said body, and a seat in the carriage, the back of which seat forms a brake when pressed against the drive-wheel.

3. The combination, with the rod M, of the lever K, the inclosing-cylinder L, attached to said lever, and having screw-caps at each end, and the rubber filling within said cylinder, which, by the adjustment of the screw-caps, is made to bind more or less on rod M, as set forth.

In testimony whereof I have signed my name to this specification in the presence of two subscribing witnesses.

HOSEA W. LIBBEY.

Witnesses:
J. H. ADAMS,
E. PLANTA.